(12) United States Patent
Won et al.

(10) Patent No.: US 10,490,097 B2
(45) Date of Patent: Nov. 26, 2019

(54) DISPLAY APPARATUS OF FLIGHT SIMULATOR AND METHOD THEREOF

(71) Applicant: NAVIWORKS CO., LTD., Seoul (KR)

(72) Inventors: Jun Hee Won, Seoul (KR); Kyong Ju Min, Seoul (KR); Yong Taek Lee, Incheon (KR); Sang Haeng Lee, Gyeonggi-do (KR)

(73) Assignee: Naviworks Co., Ltd., Seoul (KR)

( * ) Notice: Subject to any disclaimer, the term of this patent is extended or adjusted under 35 U.S.C. 154(b) by 21 days.

(21) Appl. No.: 14/915,446

(22) PCT Filed: May 12, 2015

(86) PCT No.: PCT/KR2015/004730
§ 371 (c)(1),
(2) Date: Feb. 29, 2016

(87) PCT Pub. No.: WO2015/182897
PCT Pub. Date: Dec. 3, 2015

(65) Prior Publication Data
US 2017/0069219 A1 Mar. 9, 2017

(30) Foreign Application Priority Data
May 27, 2014 (KR) .................. 10-2014-0063558

(51) Int. Cl.
*G09B 9/30* (2006.01)
(52) U.S. Cl.
CPC .................. *G09B 9/302* (2013.01)

(58) Field of Classification Search
CPC .......... G09B 9/302; G09B 9/003; G09B 9/46; G09B 5/00
See application file for complete search history.

(56) References Cited

U.S. PATENT DOCUMENTS

| | | | |
|---|---|---|---|
| 2008/0064013 A1* | 3/2008 | Quimper ................ | G09B 9/30 434/38 |
| 2010/0266991 A1 | 10/2010 | Gregoire et al. | |
| 2015/0324095 A1* | 11/2015 | Brown ................ | G06F 3/0481 715/799 |

FOREIGN PATENT DOCUMENTS

KR          1020120042430          9/2013

OTHER PUBLICATIONS

International Search Report issued in connection to International Application No. PCT/KR2015/004730, 9 pages, dated Aug. 17, 2015.

* cited by examiner

*Primary Examiner* — Timothy A Musselman
(74) *Attorney, Agent, or Firm* — McKee, Voorhees & Sease, PLC

(57) ABSTRACT

A display device of a simulation flight vehicle and an operating method thereof. That is, when a vehicle type for training is selected for performing a flight training using a simulation flight vehicle, the measuring instrument information of the selected vehicle type is changed to be the same as that of an actual flight vehicle for display, such that convenience and effectiveness of the flight training can be greatly enhanced.

16 Claims, 3 Drawing Sheets

DISPLAY APPARATUS OF FLIGHT SIMULATOR AND METHOD THEREOF

CROSS-REFERENCE TO RELATED APPLICATIONS

This is a National Phase application claiming priority to International Application PCT/KR2015/004730 filed May 12, 2015, which claims priority to Korean Application 10-2014-0063558 filed May 27, 2014, all of which are herein incorporated by reference in their entireties.

FIELD OF THE INVENTION

The present invention relates generally to a display device of a simulation flight vehicle. More specifically, but not exclusively, the invention relates to a method of, when a vehicle type of the simulation flight vehicle is selected, changing measuring instrument information of the simulation flight vehicle to be the same as that of the measuring instrument information which corresponds to the selected vehicle type and displaying the changed measuring instrument information.

BACKGROUND OF THE INVENTION

Generally, as for flight training for a flight vehicle including a helicopter, an airplane, etc., the flight training can be performed by using a simulation flight vehicle.

In order to maximize a training effect for the flight training using the simulation flight vehicle, it is the most important to adapt a flight environment of the simulation flight vehicle to be as close as possible to that of an actual flight vehicle.

In order to accomplish this, the simulation flight vehicle requires an instrument panel and function buttons which have the same shapes as those of the actual flight vehicle; however, it is not only time-consuming but also costly to manufacture them to be close to the actual ones, and it also requires much cost to maintain them.

BRIEF SUMMARY OF THE INVENTION

The present invention has been envisaged based on the consideration of the aforementioned situations, and an objective to be attained by the present invention is to, when a vehicle type for training is selected for performing a flight training using a simulation flight vehicle, change the measuring instrument information of the selected vehicle type to be the same as that of an actual flight vehicle for display, such that convenience and effectiveness of the flight training can be greatly enhanced.

Therefore, it is a primary object, feature, and/or advantage of the invention to improve on and/or overcome the deficiencies in the art.

It is another object, feature, and/or advantage of the invention to provide a display device according to an aspect of the present invention for achieving the aforementioned objective is characterized in comprising: a determining unit which, when a vehicle type of a simulation flight vehicle is selected, determines whether measuring instrument information of the selected vehicle type is to be displayed based on a state of a panel unit on which the measuring instrument information, which is related to the simulation flight vehicle, is displayed; and a display unit which, when it is determined that the measuring instrument information of the selected vehicle type is to be displayed, displays the measuring instrument information of the selected vehicle type on the panel unit.

It is yet another object, feature, and/or advantage of the invention to provide a display device wherein the state of the panel unit characterized in may include at least one of the positions and numbers of at least two measuring instrument panels.

It is a further object, feature, and/or advantage of the invention to provide a display device wherein the determining unit that is characterized in may be configured to determine that the measuring instrument information of the selected vehicle type is to be displayed only when at least one of the positions and/or numbers of the at least two measuring instrument panels enables all of measuring instrument information of an actual flight vehicle, which corresponds to the selected vehicle type, to be displayed.

It is still a further object, feature, and/or advantage of the invention to provide a display device wherein the determining unit is characterized in that it determines that the measuring instrument information of the selected vehicle type is to be displayed only when the numbers and the positions of the at least two measuring instrument panels enable at least some measuring instrument information, which is required during a specific flight training, of all the measuring instrument information of the actual flight vehicle, which corresponds to the selected vehicle type, to be displayed.

It is still yet a further object, feature, and/or advantage of the invention to provide an operating method of a display device according to an aspect of the present invention for achieving the aforementioned objective. The operating method of the display device is characterized in comprising: a determining step in which, when a vehicle type of a simulation flight vehicle is selected, it is determined whether measuring instrument information of the selected vehicle type is to be displayed based on a state of a panel unit on which the measuring instrument information, which is related to the simulation flight vehicle, is displayed; and a display step in which, when it is determined that the measuring instrument information of the selected vehicle type is to be displayed, the measuring instrument information of the selected vehicle type is displayed on the panel unit.

More specifically, the state of the panel unit characterized in that may include at least one of positions and numbers of at least two measuring instrument panels.

More specifically, the operating method of a display device is characterized in that, in the determining step, it is determined that the measuring instrument information of the selected vehicle type is to be displayed only when at least one of positions and numbers of the at least two measuring instrument panels enable all of measuring instrument information of an actual flight vehicle, which corresponds to the selected vehicle type, to be displayed.

More specifically, the operating method of a display device is characterized in that, in the determining step, it is determined that the measuring instrument information of the selected vehicle type is to be displayed only when the numbers and the positions of the at least two measuring instrument panels enable at least some measuring instrument information, which is required during a specific flight training, of all the measuring instrument information of the actual flight vehicle, which corresponds to the selected vehicle type, to be displayed.

These and/or other objects, features, and advantages of the invention will be apparent to those skilled in the art. The invention is not to be limited to or by these objects, features and advantages. No single embodiment need provide each and every object, feature, or advantage.

Figure 1:
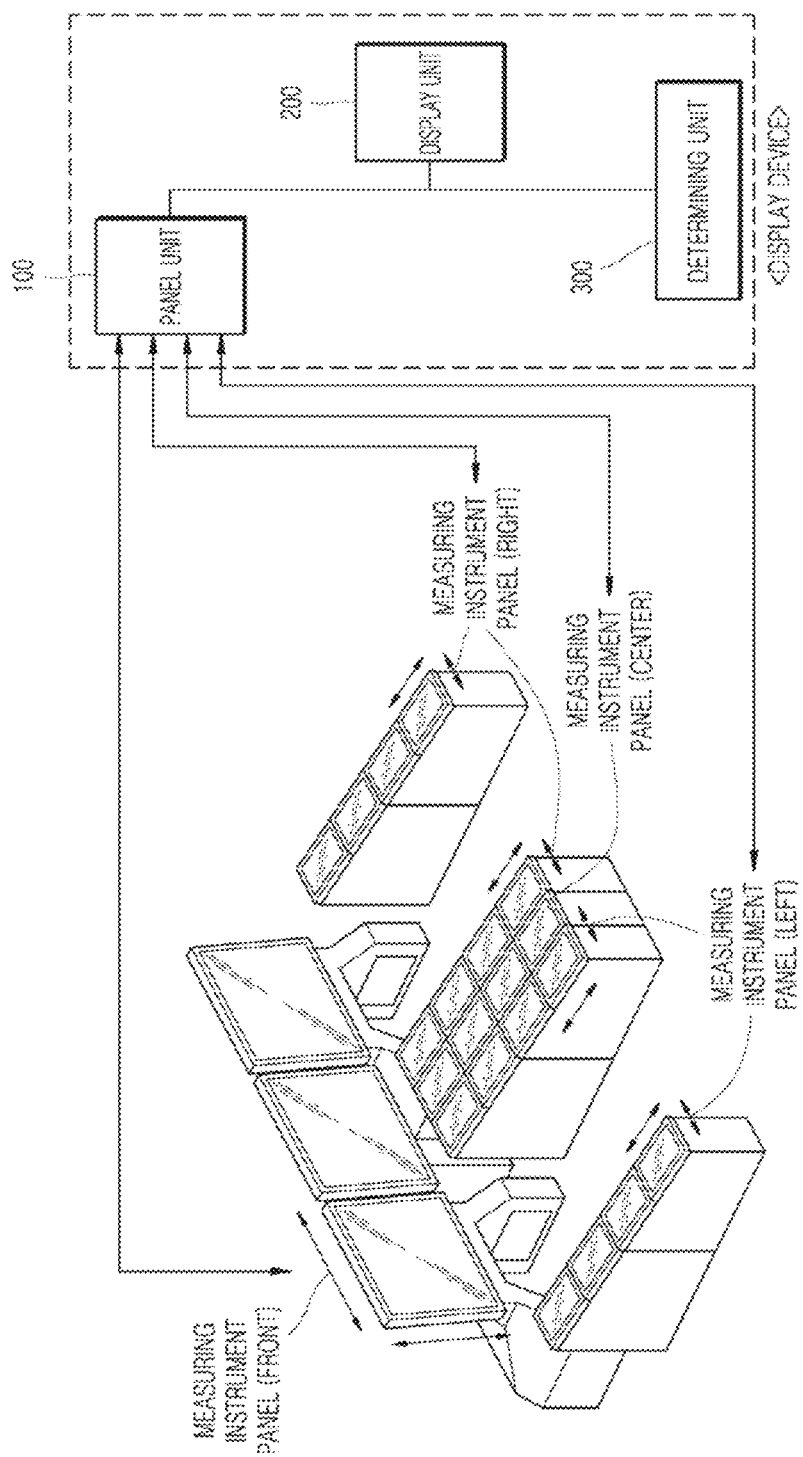
FIG. 1 is a schematic configuration diagram of a display device according to an embodiment of the present invention.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The invention is directed towards a display device of a simulation flight vehicle.

Here, one exemplary embodiment of the present invention is described by referring to the appended figures.

FIG. 1 is a diagram illustrating a display device according to one embodiment of the present invention.

As shown in FIG. 1, the display device according to an embodiment of the present invention can have a configuration including a panel unit 100 which displays the measuring instrument information related to the aviation of a simulation flight vehicle, a display unit 200 which displays the measuring instrument information on the panel unit 100, and a determining unit 300 which determines whether to display the measuring instrument information or not and enables the display unit 200 to display the measuring instrument information on the panel unit 100.

Here, all or a part of the configuration of the aforementioned display device including the panel unit 100, the display unit 200, and the determining unit 300 can be implemented as a hardware module or a software module, or as a combination of the hardware module and the hardware module.

The display device having the configuration as mentioned above refers to a device which is mounted on the simulation flight vehicle for flight training, and displays the measuring instrument information, which is related to the flight, to a passenger (a pilot). In order to accomplish this, the panel unit 100 may consist of a plurality of measuring instrument panels, and these measuring instrument panels can be implemented as a device such as a liquid crystal display (LCD) device which supports a touch screen function for sensing a contact of the passenger upon a screen.

Here, the measuring instrument information displayed on the respective measuring instrument panels may include a flight state of the simulation flight vehicle displayed on the instrument panel (for example: information of a speedometer, an altimeter, a leveling meter, a radar, a fuel gauge, a revolution per minute (RPM) indicator, etc.), and information from various function buttons which receive aviation signals inputted by the passenger; however, the measuring instrument information is not restricted to these and it can include various other information which is related to the aviation of the simulation flight vehicle.

As for the function buttons, a desired function of the flight vehicle as required by the passenger can be activated or deactivated by using the touch screen function of the measuring instrument panel, such as by way of a finger contact upon a displayed icon on the measuring instrument panel.

For reference, a removable bezel plate (not shown in the figures), on which holes with the same shapes as those of the displaying measuring instrument panel and function buttons are formed, can be additionally provided on/at an upper portion of the measuring instrument panel, and it is provided to realize the same environment as an indoor environment of the actual flight vehicle on the simulation flight vehicle.

Meanwhile, according to an embodiment of the present invention, there is realized a method for maximizing a training effect for flight training using the simulation flight vehicle by adapting the flight environment of the simulation flight vehicle to be as close as possible to that of an actual flight vehicle.

In order to accomplish this, the measuring instrument information, which is the same as that of the actual flight vehicle, is displayed on the panel unit 100, such that the passenger can experience the same flight environment as in the actual flight vehicle.

Here, when the measuring instrument information, which is the same as or similar to that of the actual flight vehicle, is displayed, the measuring instrument information displayed on the panel unit 100 is constructed by simulating the position and the shape of the measuring instrument information for a flight vehicle of a specific vehicle type among various actual flight vehicles in order to perform the flight training, and it is beneficial for the measuring instrument information to have a display shape of a fixed layout.

The position and the shape of the measuring instrument information of the actual flight vehicle can vary across various vehicle types, and the training effect cannot be guaranteed when the measuring instrument information displayed on the simulation flight vehicle has the display shape of a fixed layout which corresponds to the specific vehicle type.

As a result, in order to maximize the training effect of the flight training using the simulation flight vehicle, a training environment which can consider the positions and shapes of the measuring instrument information which is different across various actual flight vehicles is highly advantageous. For example, a training environment resembling a cockpit of an airplane that may be configured between the cockpit of a small personal airplane, a jet plane, or a large commercial airplane.

Therefore, one embodiment of the present invention is intended to propose a solution for considering the positions and shapes of the measuring instrument information which is different across different actual flight vehicles, and the solution will be explained in detail in the following.

Meanwhile, in one embodiment of the present invention, it is assumed for convenience of explanation that the flight training is directed toward the training for flying a helicopter, among other various actual flight vehicles.

The determining unit 300 performs a function of acknowledging a state of the panel unit 100. More specifically, when selection information related to the selection of the vehicle type of the simulation flight vehicle (for example: 500MD, BO-105, UH-1H, UH-60, AH-1 S, CH-47) is inputted, the determining unit 300 comes to acknowledge the state of the panel unit 100 on which the measuring instrument information of the simulation flight vehicle is displayed.

Here, the selection information can include the measuring instrument information including the positions and shapes of the instrument panel, on which the flight state of the actual flight vehicle of the selected vehicle type is displayed, and the function buttons for receiving aviation signals from the passenger.

Here, the reason that the determining unit 300 acknowledges the state of the panel unit 100 is to acknowledge whether the panel unit 100 can display the measuring instrument information of the actual flight vehicle included in the selection information. In the meantime, the determining unit 300 can acknowledge, as the state of the panel unit 100, the numbers and the positions of the respective measuring instrument panels which constitute the panel unit 100.

For reference, when the vehicle type of the simulation flight vehicle is selected, it is also possible to provide, prior to a procedure for acknowledging the state of the panel unit 100 as described in the above, a guidance screen related to the numbers and the positions of the measuring instrument panels for displaying the measuring instrument information of the selected vehicle type, such that an operator or the passenger can manipulate the numbers and the positions of the measuring instrument panels, which constitute the panel unit 100, according to the provided guidance screen.

Also, the determining unit 300 performs the function of determining whether the measuring instrument information of the selected vehicle type is to be displayed or not. More specifically, when the numbers and the positions of the measuring instrument panels are acknowledged as the state of the panel unit 100, the determining unit 300 can determine whether the acknowledged numbers and positions of the measuring instrument panels are such that the measuring instrument information of the actual flight vehicle of the selected vehicle type can be displayed, and then comes to determine whether the measuring instrument information of the selected vehicle type can be displayed.

When the acknowledged numbers and the positions of the measuring instrument panels are such that all of the instrument panels and the function buttons of the actual flight vehicle of the selected vehicle type can be displayed, the determining unit 300 can determine that the panel unit 100 has a state that enables it to display the measuring instrument information of the selected vehicle type.

For example, there is proposed a case in which, as in FIG. 1, 3 measuring instrument panels at a front portion, 8 left measuring instrument panels for a left passenger, 8 right measuring instrument panels for a right passenger, and 4 center measuring instrument panels are provided in order to display all of the measuring instrument information of the selected vehicle type.

Here, when it is acknowledged that the numbers and the positions of the acknowledged measuring instrument panels, which are acknowledged for the simulation flight vehicle, are such that the measuring instrument panels are arranged according to the numbers and the positions as mentioned above, it can be determined that the panel unit 100 has a state that enables it to display the measuring instrument information of the selected vehicle type.

Needless to say, it will be apparent to a person skilled in the art that, when it is acknowledged that the numbers and the positions of the acknowledged measuring instrument panels are such that the measuring instrument panels are not arranged according to the numbers and the positions as mentioned above, it can be determined that the panel unit 100 is not in a state that enables it to display the measuring instrument information of the selected vehicle type.

Figure 2:
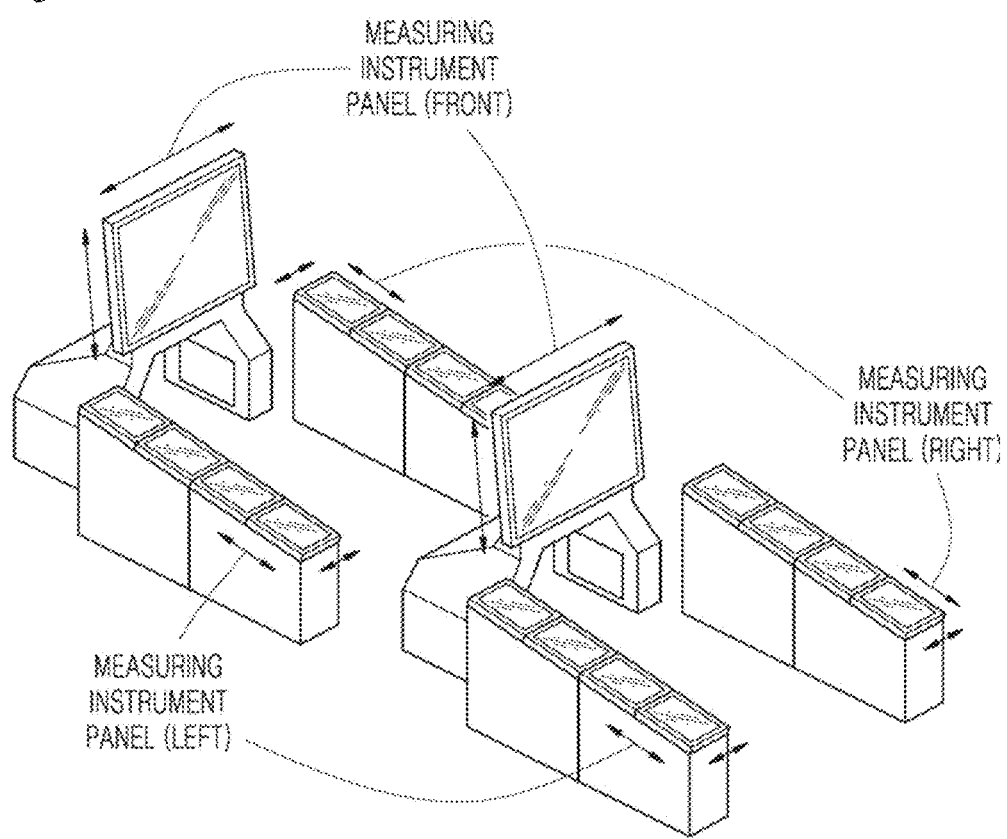
FIG. 2 is a diagram for describing the arrangement of a measuring instrument panel according to another embodiment of the present invention.

As another example, there can be proposed a case in which, as shown in FIG. 2, one front measuring instrument panel, 4 left measuring instrument panels, and 4 right measuring instrument panels are may be utilized for both front and back passengers, respectively, in order to display all of the measuring instrument information of the selected vehicle type.

The same principal also applies to this case; that is, only when it is acknowledged that the numbers and the positions of the acknowledged measuring instrument panels are such that the measuring instrument panels are arranged according to the numbers and the positions as mentioned above, it can be determined that the panel unit 100 has a state that enables it to display the measuring instrument information of the selected vehicle type.

For reference, when determining unit 300 determines that the panel unit 100 cannot display the measuring instrument information of the selected vehicle type, correction information for correcting the numbers and the positions of the measuring instrument panels, which are arranged in the simulation flight vehicle, can be displayed, such that the operator or the passenger can correct the numbers and the positions of the measuring instrument panels according to the correction information.

Meanwhile, in an embodiment of the present invention, it is generally assumed that the measuring instrument information of the selected vehicle type is displayed only when the acknowledged numbers and the positions of the measuring instrument panels are such that all of the measuring instrument information of the selected vehicle type can be displayed; however, this assumption can be overruled in some cases.

That is, in addition to the instrument panel, on which the flight state of the actual flight vehicle of the selected vehicle type is displayed, and the function buttons for receiving the aviation signals from the passenger, the selection information can further include training information which is the information related to the specific flight training to be performed by using the selected vehicle type.

Here, all the functions of the selected vehicle type such as landing, life saving, transporting, etc. are not used for the specific flight training, and, on the other hand, only some functions which correspond to the objective of the training can be used for the specific flight training. When it is said that only some functions, which correspond to the objective of the training, are used, it means that it is possible that some of all measuring instrument information of the selected vehicle type can be used for the training.

Therefore, when the training information related to the specific flight training is included in the selection information, the determining unit 300 can determine whether the numbers and the positions of the measuring instrument panels are such that the panel unit can display only some of the measuring instrument information required for the specific flight training, rather than all of the measuring instrument information of the actual flight vehicle of the selected vehicle type. For example, while all functions of the flight vehicle including combat functions such as tracking missiles, radar manipulations, and maneuver flights, etc. are required in addition to basic flight functions in case of a combat flight training, only basic flight functions are required for a flight training such as a training for saving lives and the combat functions as mentioned above are not necessary for the flight training.

In this case, it is sufficient to determine whether the acknowledged numbers and the positions of the measuring instrument panels are such that only the measuring instrument information related to the basic flight functions can be displayed, and, therefore, an effect of facilitating the flight training while minimizing the number of the measuring instrument panels constituting the panel unit 100 can be obtained.

The display unit 200 performs a function of displaying the measuring instrument panel of the selected vehicle type on the panel unit 100. More specifically, when the determining unit 300 determines to display the measuring instrument information of the selected vehicle type, the display unit 200 loads the pre-stored measuring instrument information of the selected vehicle type and displays the loaded information on the respective measuring instrument panels which are arranged in the simulation flight vehicle and, therefore, enables the passenger of the simulation flight vehicle to experience the same flight environment as in the actual flight vehicle.

As described in the above, according to the display device of an embodiment of the present invention, when a vehicle type for training is selected for performing a flight training using a simulation flight vehicle, the measuring instrument information of the selected vehicle type is changed to be the same as that of an actual flight vehicle for display, such that convenience and effectiveness of the flight training can be greatly enhanced.

Figure 3:
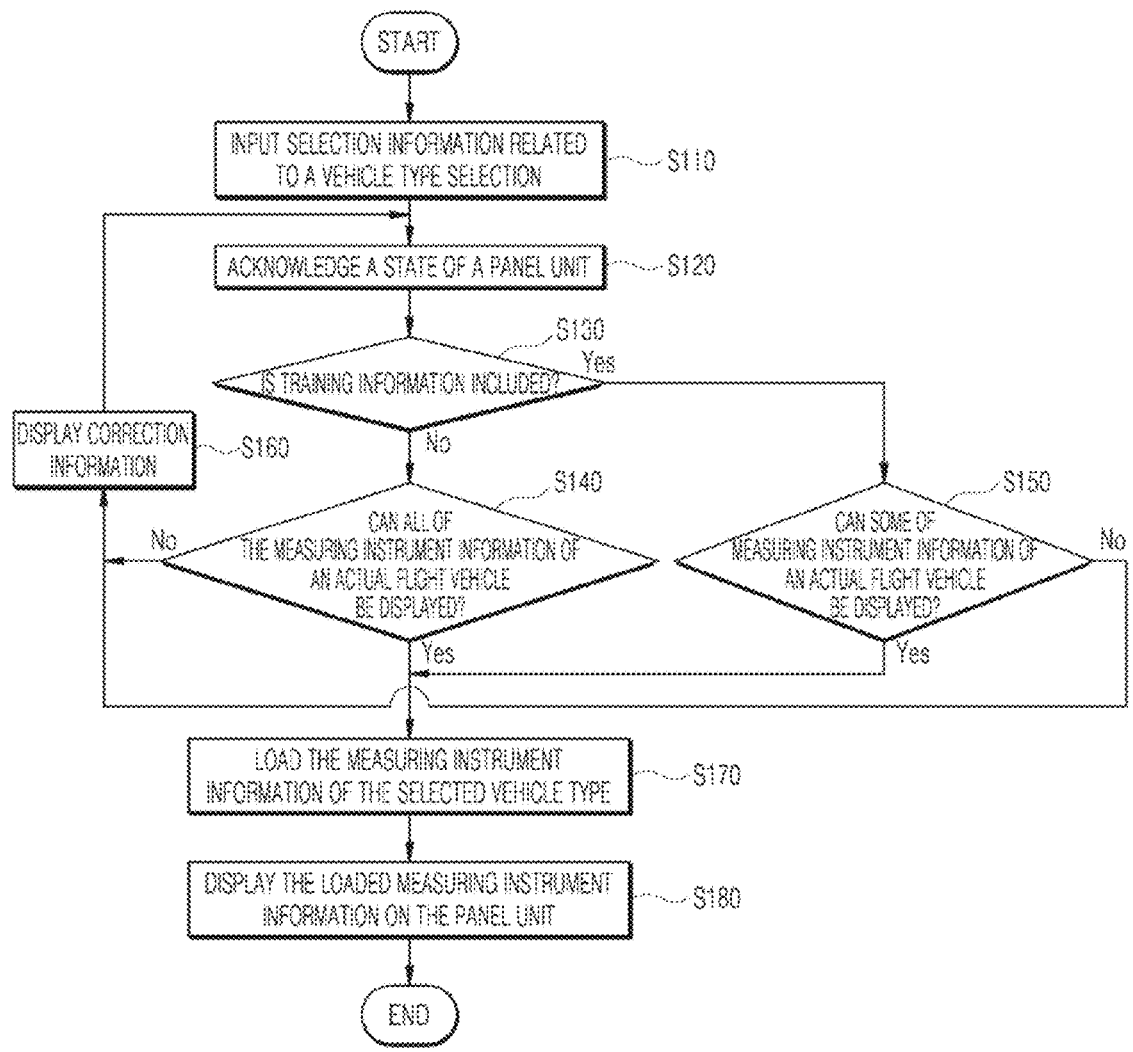
FIG. 3 is a flowchart for illustrating an operation flow of the display device according to an embodiment of the present invention.

In the following, an operation method of the display device according to an embodiment of the present invention will be explained in detail by referring to FIG. 3. Here, the configurations described in the FIG. 1 and FIG. 2 are referred to by using corresponding reference numbers for the convenience of description.

When the selection information related to the selection of the vehicle type of the simulation flight vehicle (for example: 500MD, BO-105, UH-1H, UH-60, AH-1S, CH-47) is inputted, the determining unit 300 acknowledges the state of the panel unit 100 on which the measuring instrument information of the simulation flight vehicle is displayed (S110-S120). The determining unit 300 may then be able to acknowledge, as the state of the panel unit 100, the numbers and the positions of the respective measuring instrument panels which constitute the panel unit 100.

When the numbers and the positions of the measuring instrument panels are acknowledged as the state of the panel unit 100, the determining unit 300 can determine whether the acknowledged numbers and positions of the measuring instrument panels are such that the measuring instrument information of the actual flight vehicle of the selected vehicle type can be displayed, and then determine whether the measuring instrument information of the selected vehicle type can be displayed (S130-S150).

Furthermore, when the acknowledged numbers and the positions of the measuring instrument panels are such that all of the instrument panels and the function buttons of the actual flight vehicle of the selected vehicle type can be displayed, the determining unit 300 can determine that the panel unit 100 has a state that enables it to display the measuring instrument information of the selected vehicle type.

Therefore, when it is acknowledged that the numbers and the positions of the acknowledged measuring instrument panels, which are acknowledged for the simulation flight vehicle, are such that all the measuring instrument information of the selected vehicle type can be displayed, it is determined that the panel unit 100 has a state that enables it to display the measuring instrument information of the selected vehicle type.

It will be apparent to a person skilled in the art that, when it is acknowledged that the numbers and the positions of the acknowledged measuring instrument panels are such that the measuring instrument panels are not arranged according to the numbers and the positions as mentioned above, it can be determined that the panel unit 100 is not in a state that enables it to display the measuring instrument information of the selected vehicle type.

Meanwhile, when the training information related to the specific flight training is included in the selection information in step S130, the determining unit 300 can determine whether the numbers and the positions of the measuring instrument panels are such that the panel unit can display some of the measuring instrument information required for the specific flight training, rather than all of the measuring instrument information of the actual flight vehicle of the selected vehicle type.

When determining unit 300 determines that the panel unit 100 cannot display the measuring instrument information of the selected vehicle type, it can enable the display unit 200 to display the correction information for correcting the numbers and the positions of the measuring instrument panels, which are arranged in the simulation flight vehicle, such that the operator or the passenger can correct the numbers and the positions of the measuring instrument panels according to the correction information (S160).

Then, when the determining unit 300 determines to display the measuring instrument information of the selected vehicle type, the display unit 200 loads the pre-stored measuring instrument information of the selected vehicle type and displays the loaded information on the respective measuring instrument panels which are arranged in the simulation flight vehicle and, therefore, enables the passenger of the simulation flight vehicle to experience the same flight environment as in the actual flight vehicle (S170-S180).

As described in the above, according to the operating method of a display device of an embodiment of the present invention, when a vehicle type for training is selected for performing flight training using a simulation flight vehicle, the measuring instrument information of the selected vehicle type is changed to be the same as that of an actual flight vehicle for display, such that convenience and effectiveness of the flight training can be greatly enhanced.

Meanwhile, the steps of the method or algorithm described in relation to the proposed embodiments can be directly implemented as hardware, or can be embodied as program instructions executable by various computer means and recorded on a computer-readable medium. The computer-readable medium can include program instructions, data files, data structures, etc. exclusively or in combination. The program instructions recorded on the medium can be specifically designed and configured for the present invention or well known to be available by a skilled artisan in computer software. In the example of the computer-readable recording medium, magnetic media such as hard disks, floppy disks, and magnetic tapes, optical media such as compact disk-read only memories (CD-ROM), digital versatile disks (DVDs), magneto-optical media such as floppy disks, and hardware devices specially configured to store and execute program instructions such as read only memories (ROMs), random access memories (RAMs), flash memories, etc. are included. In the example of the computer instructions, machine language codes created by a compiler as well as a high level language code executable by a computer using an interpreter, etc. are included. The hardware device can be configured to operate as one or more software module for performing the operations of the present invention, and vice versa.

Although the present invention is explained in detail by referring to preferred embodiments, the present invention is not restricted to the above embodiments, and the technical scope of the present invention encompass the range where a person with an ordinary skill in the relevant art can readily vary or modify without deviating from the subject matter as claimed in claims.

What is claimed is:

1. A display device comprising:
a determining unit which, when one vehicle type of a simulation flight vehicle is selected from a plurality of vehicle types, determines whether measuring instrument information of the selected vehicle type is to be displayed based on a state of a panel unit on which the measuring instrument information, which is related to the simulation flight vehicle, is displayed;
a display unit which, when it is determined that the measuring instrument information of the selected vehicle type is to be displayed, displays the measuring instrument information of the selected vehicle type on the panel unit; and
the display unit displaying correction information when the determining unit determines that the measuring instrument information is not to be displayed.

2. The display device of claim 1, wherein the state of the panel unit includes at least one of a plurality of positions and/or numbers of at least two measuring instrument panels.

3. The display device of claim 2, wherein the determining unit determines that the measuring instrument information of the selected vehicle type is to be displayed only when at least one of a plurality of positions and/or numbers of the at least two measuring instrument panels enable all of measuring instrument information of an actual flight vehicle, which corresponds to the selected vehicle type, to be displayed.

4. The display device of to claim 2, wherein the determining unit determines that the measuring instrument information of the selected vehicle type is to be displayed only when the numbers and the positions of the at least two measuring instrument panels enable at least some measuring instrument information, which is required during a specific flight training, of all the measuring instrument information of the actual flight vehicle, which corresponds to the selected vehicle type, to be displayed.

5. The display device of to claim 4, wherein the specific flight training is combat training.

6. The display device of to claim 1, wherein the selected vehicle type is a helicopter.

7. An operating method of a display device, said method comprising:
selecting one flight vehicle type from a plurality of flight vehicle types; then
determining which measuring instrument information of the selected flight vehicle type is to be displayed based on a state of a panel unit on which the measuring instrument information, which is related to the simulation flight vehicle, is to be displayed; and
displaying the measuring instrument information of the selected flight vehicle type on the panel unit.

8. The operating method of claim 7, wherein the state of the panel unit includes at least one of a plurality of positions and/or numbers of at least two measuring instrument panels.

9. The operating method of claim 8, wherein the determining step determines that the measuring instrument information of the selected flight vehicle type is to be displayed only when at least one of plurality of positions and/or numbers of the at least two measuring instrument panels enables all of measuring instrument information of an actual flight vehicle, which corresponds to the selected flight vehicle type, to be displayed.

10. The operating method of claim 8, wherein the determining step determines which of the measuring instrument information of the selected flight vehicle type is to be displayed only when the numbers and/or positions of the at least two measuring instrument panels enable at least some measuring instrument information, which is required during a specific flight training, of all the measuring instrument information of the actual flight vehicle, which corresponds to the selected flight vehicle type, to be displayed.

11. The method of claim 7 further comprising displaying correction information the display unit when the determining unit determines that the measuring instrument information is not to be displayed.

12. A non-transitory computer readable medium storing a program causing a computer to execute a display process, said display process comprising:
selecting a flight vehicle type for the simulation from a plurality of flight vehicle types; and then determining which measuring instrument information corresponds to the selected flight vehicle type;
determining which measuring instrument information should be displayed based on the state of a panel unit of a display device that the measuring instrument will be displayed on; and
displaying the measuring instrument information corresponding to the stored flight vehicle type on the display device.

13. The non-transitory computer readable medium of claim 12, wherein the state of the panel unit includes at least one of a plurality of positions and/or numbers of at least two measuring instrument panels.

14. The non-transitory computer readable medium of claim 12, wherein the measuring instrument information of the selected flight vehicle type is to be displayed only when at least one of plurality of positions and/or numbers of the at least two measuring instrument panels enables all of the measuring instrument information of an actual flight vehicle, which corresponds to the selected flight vehicle type, to be displayed.

15. The non-transitory computer readable medium of claim 12, the measuring instrument information of the selected flight vehicle type is to be displayed only when the numbers and/or positions of the at least two measuring instrument panels enable at least some measuring instrument information, which is required during a specific flight training, of all the measuring instrument information of the actual flight vehicle, which corresponds to the selected flight vehicle type, to be displayed.

16. The display device of claim 12 further comprising the display unit displaying correction information when the determining unit determines that the measuring instrument information is not to be displayed.

* * * * *